(12) United States Patent
Iwanami et al.

(10) Patent No.: US 6,703,999 B1
(45) Date of Patent: Mar. 9, 2004

(54) SYSTEM FOR COMPUTER USER INTERFACE

(75) Inventors: Hiroyuki Iwanami, Stanford, CA (US); Liba Xia, Mountain View, CA (US); Feng Xue, Stanford, CA (US); Hsin-Wang Wayne Chang, San Jose, CA (US); Han Lin, Sunnyvale, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 150 days.

(21) Appl. No.: 09/709,721

(22) Filed: Nov. 13, 2000

(51) Int. Cl.[7] ................................................ G09G 5/08
(52) U.S. Cl. ........................ 345/158; 345/7; 345/8; 345/9; 345/156; 345/157; 345/168; 345/175
(58) Field of Search ............................... 345/175, 7, 8, 345/9, 173, 157, 158, 156, 168

(56) References Cited

U.S. PATENT DOCUMENTS

| | | | | |
|---|---|---|---|---|
| 5,288,078 A | * | 2/1994 | Capper et al. | 273/148 B |
| 5,414,439 A | * | 5/1995 | Groves et al. | 345/7 |
| 5,825,351 A | * | 10/1998 | Tam | 345/173 |
| 5,914,709 A | * | 6/1999 | Graham et al. | 345/179 |
| 5,977,867 A | * | 11/1999 | Blouin | 340/407 |
| 6,262,848 B1 | * | 7/2001 | Anderson et al. | 359/630 |
| 6,333,735 B1 | * | 12/2001 | Anvekar | 345/175 |
| 6,373,472 B1 | * | 4/2002 | Palalau et al. | 345/173 |
| 6,377,238 B1 | * | 4/2002 | McPheters | 345/156 |

FOREIGN PATENT DOCUMENTS

| | | |
|---|---|---|
| JP | 5-10151 | 2/1993 |
| JP | 9-81309 | 3/1997 |
| JP | 10-29540 | 2/1998 |
| JP | 11-321662 | 11/1999 |
| JP | 2000-168468 | 6/2000 |

* cited by examiner

Primary Examiner—Richard Hjerpe
Assistant Examiner—Jennifer T. Nguyen
(74) Attorney, Agent, or Firm—Oliff & Berridge, PLC

(57) ABSTRACT

A computer user interface for use in a transport vehicle (10), which defines a virtual control panel in the upper open area of the vehicle steering wheel (12). The user enters inputs by action in appropriate sections of the virtual control panel area. A computer controlled display (20) illustrates a map to the user of locations of sections in the virtual control panel area, and information that can be input by user action with particular sections. A sensor (22) monitors the virtual control panel area, and produces electronic information corresponding to user action in the virtual control panel area. Software logic in a computer (46) analyzes the electronic information to determine if there has been user action and the location thereof, for designating an action as a particular user input. Based upon the designation, the computer produces an appropriate output, such as operating or adjusting vehicle systems.

19 Claims, 6 Drawing Sheets

F I G. 1
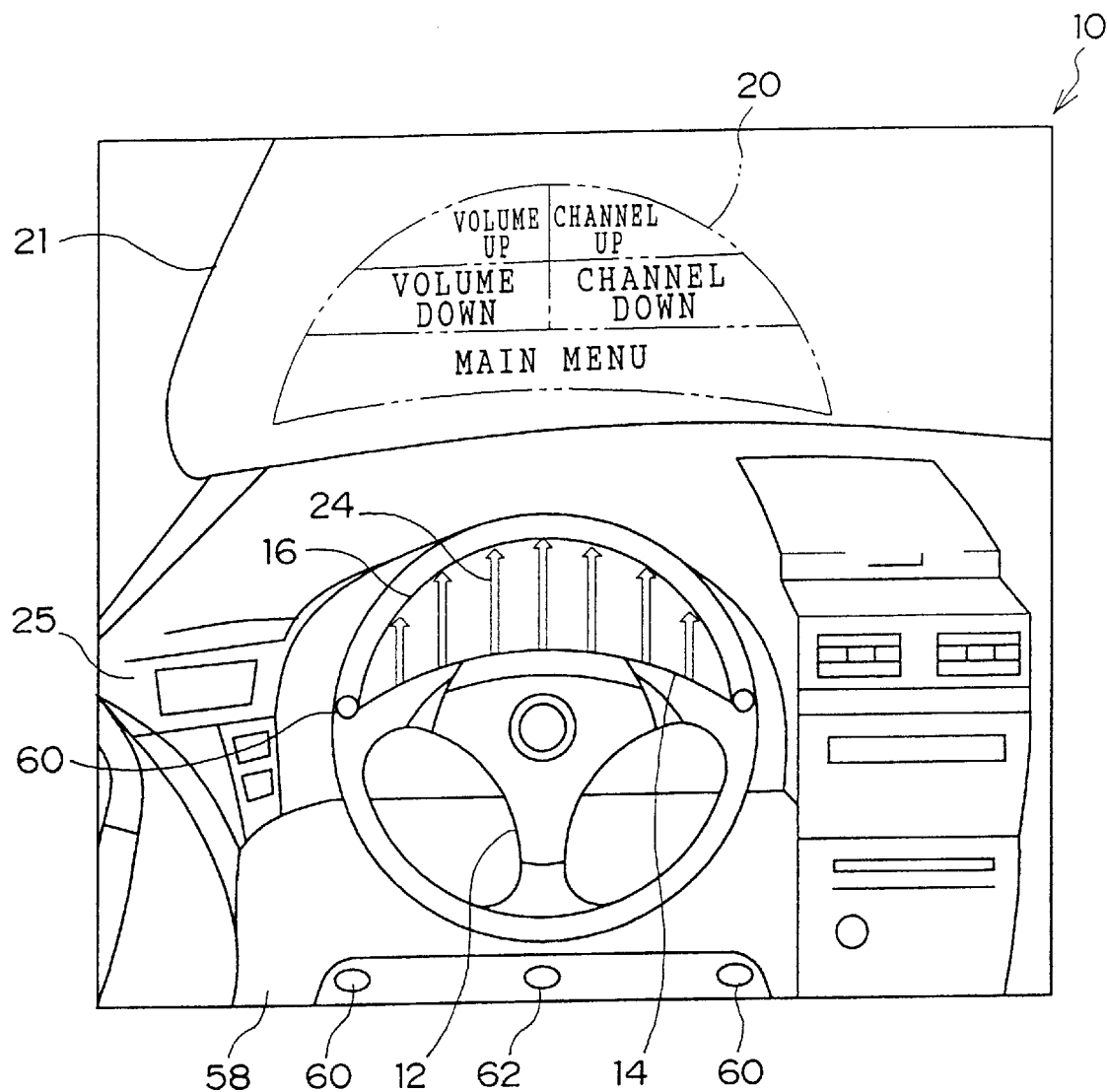

SYSTEM FOR COMPUTER USER INTERFACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to user interfaces for computers, and in particular to computer user interfaces suitable for mobile environments, such as a transport vehicle.

2. Background Information

As information technologies continue to develop, new information technology applications will probably continue to find their way into motor vehicles. CD and DVD players, telephones, Global Positioning System ("GPS") based navigation, television and Internet access have already been incorporated into some vehicles.

Interacting with any such system results in a tradeoff with the time the user spends concentrating on driving. As such, it is of increasing importance to develop systems in which the driver can interact with the vehicle systems in a safe and efficient manner.

GPS based navigation systems have been problematic to safely and efficiently incorporate into motor vehicles. Typically, GPS navigation systems require a relatively large amount of information to be entered to make use of its features, making the question of driver interface of greater importance. Users may need to input destination addresses, often several letters long, thus requiring a significant amount of the user's time and attention to input. If the driver must perform this task while driving, any attention given to the navigation system means that less attention is given to actual driving of the vehicle.

GPS navigation is available to the general public, although to a lesser extent in the USA as compared to Japan. Japan has addressed the growing problem of driver distraction with a law that essentially requires any use of multimedia systems in motor vehicles to be performed while the driver maintains both hands on the steering wheel.

Current commercial navigators show that most input systems are based on a four to eight key directional key-pad to select choices from a menu. This input mode is sometimes augmented by a voice recognition system. However, demonstrations of the voice-recognition systems, including tests of personal computer ("PC") based software as well as actual voice-recognition equipped navigators, has shown some unreliability. Environmental background noise in a vehicle is generally more severe than in an office. Hence, there is a greater tendency for error in voice-recognition systems when used in vehicles, relative to an office environment.

For compliance with the law, it appears that current commercially available motor vehicle navigation systems in Japan, will require the user to enter information while the vehicle is stationary. This detracts considerably from the usability of the system. Assuming no passenger is present to operate the navigation system for the driver, a destination change in-route requires stopping the vehicle. If the motor vehicle is proceeding along a freeway, this would be a nontrivial waste of time.

The navigator is a representative system with basic needs for input, feedback, and output. Devices such as the radio and CD player, while perhaps less demanding than a GPS navigator, also pose interaction problems. As Internet access becomes more widely available in motor vehicles, other situations are likely to arise have more demanding requirements. Accordingly, there is a need for an improved interface between a driver and motor vehicle systems.

SUMMARY OF THE INVENTION

A preferred method or system of providing a computer user interface in a transport vehicle having a steering wheel, results in improved safety and efficiency for a user to simultaneously drive and enter input. In this regard, the system includes defining an open area proximate the vehicle steering wheel as a virtual control panel for user action or input. The user enters inputs by contacting the area, such as by inserting a fingertip or thumb into selected sections of the area. As the area is proximate the steering wheel, the user has the ability to operate the vehicle and enter inputs without removing his or her hands from the steering wheel.

The system includes monitoring the area with a sensor, which produces electronic information corresponding to user action in the area. Computer logic thereafter processes or analyzes electronic information from the sensor. The logic preferably determines from the electronic information, a location of user action in the area, and the type of action, and designates the user action as a particular input according to the location and action. Based on the designation, the computer produces output signals as appropriate.

For aiding the sensor in detecting user action in the area, the system further includes an energy source disposed for producing a sensing field substantially along the area when the energy source is operated. In a preferred embodiment, the energy source is a series of light emitting diodes oriented for radiating a screen of infrared light along the area. The screen of infrared light provides illumination for the sensor and defines the area for detection of user action therein.

Infrared light is used for the light screen because light in the infrared region is essentially invisible to unaided human eyesight. A sensing field formed from a screen of light invisible to the user results in greater interface transparency and reduces user distraction.

Provision of the screen of infrared light includes orienting the screen with the light forming the screen, radiating upwardly relative to the vehicle. The upward orientation improves reliability in detecting user action in the area by reducing noise due to infrared light in sunlight. Specifically, most sunlight radiating around the steering wheel during driving, enters the vehicle through the front windshield in a generally downward direction. To at least some extent, the upward orientation of the infrared light screen thereof allows the sensing field to be directionally distinguishable from sunlight radiating downward into the vehicle.

The system further includes mounting a vibrator at a location proximate the user when the user is positioned for driving the vehicle, such as on the steering wheel and/or in the driver's side seat. The vibrator is then selectively operated via the computer for providing computer feedback to the user. The vibrator advantageously provides haptic feedback (feedback relating to or based on the sense of touch) for relieving the visual load on the user. As safe driving involves visual vigilance to a large degree, relieving the driver's visual load improves safety. Additionally, permitting the driver to enter input while keeping both hands on the steering wheel, also relieves the driver's visual load.

The system further includes provision of a display electronically connected to the computer. The computer includes logic, which when executed by the computer, causes a map to be shown on the display, indicating locations of predefined sections with the area, and information corresponding to each predefined section that will be designated as input from the user if the performs an action in that predefined section.

The display is preferably presented to the user at a location that does not require the user to look away from the vehicle's forward path of travel, when the user is driving the vehicle, such as a heads-up display. Alternatively, the display is at a location and orientation, easily observable by the vehicle operator when driving, such as on the vehicle dashboard or instrument panel. Thus, the user can simultaneously drive and observe the display, without substantial aversion of his or her eyes from the forward direction of vehicle travel while driving.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 schematically illustrates a portion of a preferred embodiment of a computer interface system in accordance with the present invention in connection with a portion of a motor vehicle;

DESCRIPTION OF THE PREFERRED EMBODIMENTS

Figure 2:
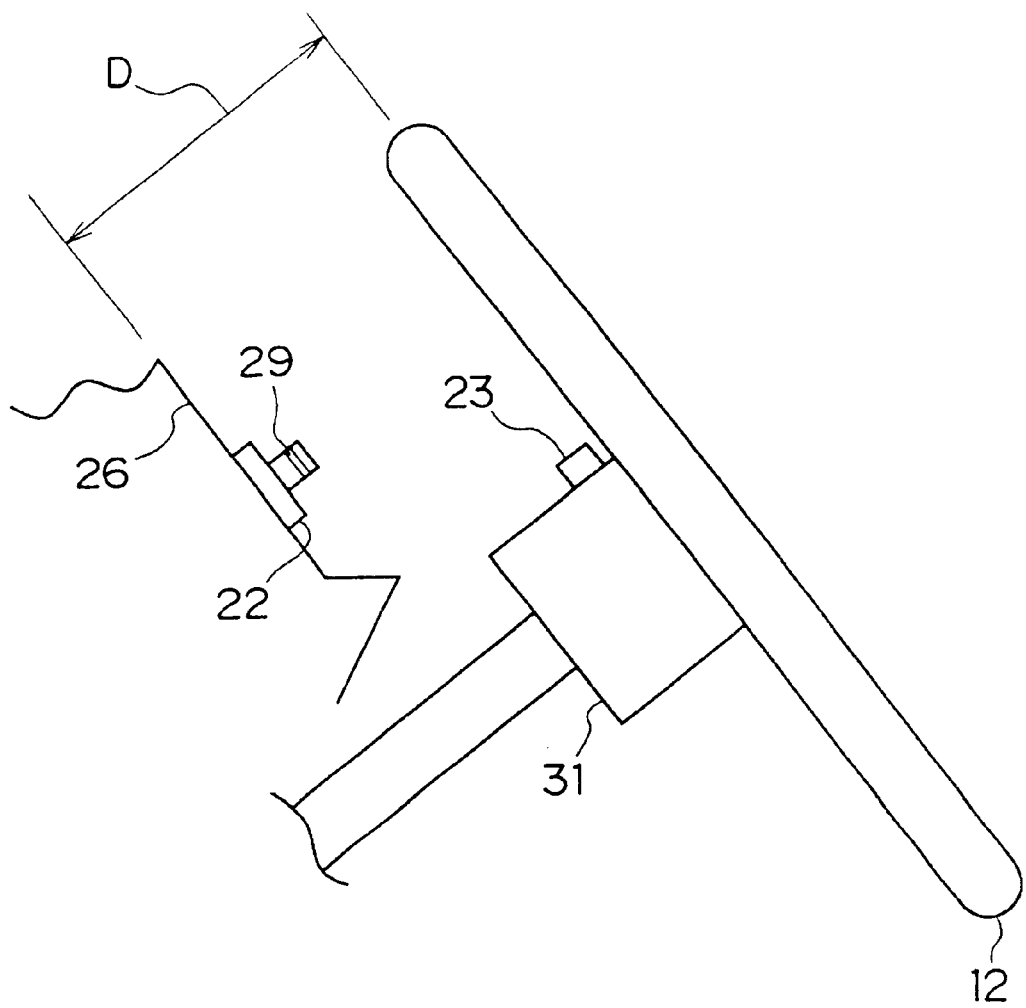
FIG. 2 schematically illustrates a side view of a part of the steering wheel and instrument panel of the vehicle of FIG. 2.

FIG. 1 schematically illustrates a portion of a preferred embodiment of a computer user interface system for a transport vehicle 10, such as an automobile, in accordance with the present invention. In response to user action or input, a computer operates various systems in the motor vehicle, such as the radio, window wipers, CD player, GPS based navigation system, and etc.

The interface system includes a volume or spatial area proximate the vehicle steering wheel 12, defined as a virtual keyboard or control panel for computer user input. The area is open such that a user can insert a digit of the user's hand through the area. Sections of the area define keys, buttons, alphanumeric character entry zones, and/or other control elements for computer user action or input. The user enters input by action in appropriate sections of the virtual control panel area.

The virtual control panel area preferably extends from approximately the steering wheel crossbar 14 to the inner periphery of the steering wheel rim 16, i.e., the upper, open portion of the steering wheel 12. This enables the user to enter input while retaining both hands on the steering wheel 12.

The interface system includes a computer controlled display 20, which illustrates a map to the user. The map indicates locations of sections in the virtual control panel area, and information that can be input by user action in particular sections.

Ideally, the computer controlled display 20 is a heads-up type display ("HUD"), which are often used in vehicles for military applications. In a HUD, the display is presented to a vehicle operator at a location that does not require the operator to look away from the vehicle's forward path of travel to see the display. HUDs often require a specially adapted eye glasses or helmet.

For convenience in describing a preferred embodiment of the invention, FIG. 1 schematically illustrates the computer controlled display 20 as appearing on the front windshield 21. A see-through type display, such as a liquid crystal type, appearing on a portion of the windshield 21 is a type of HUD.

However, due to cost, technology limitations (such as the requirement for special eye glasses), and/or other factors, the computer controlled display 20 may be a conventional computer panel disposed on the instrument panel 26 (see FIG. 2) or the dashboard 25 at an orientation and location easily observable by the vehicle operator.

Referring to FIG. 2, the interface system includes a sensor 22, which monitors the area to sense or record user action with or in the virtual control panel area. The sensor 22 is preferably an image sensing type, such as the kinds used in digital photographic equipment. More particularly, the image sensor 22 is a charged coupled device ("CCD") type camera sensor.

Alternatively, the image sensor 22 is a complementary metal oxide semiconductor ("CMOS") type camera sensor. While CCD cameras may presently be more widely available, CMOS cameras have three principal advantages. First, it can be produced at lower cost, with smaller size and weight. Second, it consumes less energy. Finally, the most promising advantage rests with its ability to mix other functions with the sensor in a single die for dramatic low-cost applications. Hence, signal processing functions could be placed on a single piece of silicon.

Due to the limitations of such sensors, the interface system preferably includes an energy source 23 for irradiating energy substantially along the virtual control panel area, which produces a sensing field 24. Specifically, the energy source 23 is preferably a source of light irradiating a screen of infrared ("IR") light rays, forming the sensing field 24. In low light conditions in particular, presently available image sensors typically do not provide sufficient information to reliably determine user input or action within the virtual control panel area.

As indicated in FIG. 1, the sensing field 24 of IR light extends proximate the steering wheel 12 for providing illumination for the sensor 22. To avoid distracting the user, IR light is used rather than visible light for the sensing field 24. In this regard, IR light cannot be discerned by the unaided human eye, but is detectable by the image sensor 22.

The sensing field 24 radiates over the area defined as the virtual control panel. That is, the area extending from approximately the top edge of the steering wheel crossbar 14 to the upper, inner periphery of the steering wheel rim 16.

To improve system accuracy and reliability, the sensing field 24, preferably radiates upward from the steering wheel crossbar 16 towards the steering wheel rim 16. As schematically illustrated in FIG. 2, the sensor 22 is preferably mounted on the instrumental panel 26, facing the driver through the upper portion of the steering wheel 12.

This arrangement tends to reduce inaccurate sensor information from IR radiation present in sunlight. Placing the sensor 22 on the instrumental panel facing the driver, shields the sensor from IR radiation in sunlight, which radiates into the vehicle through the front windshield 28. The back of the driver's seat and the driver's body shield the sensor 22 from sunlight entering the vehicle through the rear window. Preferably, the sensor 22 includes at least one bandwidth filter 29 centered approximately around the nominal wavelength of the light radiation forming the sensing field 24 for further enhancing accuracy in discerning user action within the virtual control panel area.

Simultaneously, the sensor 22 has a good, well illuminated field of view for observing user action in the area defined as the virtual control panel. The light forming the sensing field 24 radiates upward. Thus, when a digit of the user contacts the virtual control panel area, light from the sensing field 24 strikes the user's digit, and tends to be redirected towards the sensor 22. Additionally, the steering wheel rim 18 can be used as a reference for image processing of sensor 22 information as described later.

Figure 3:
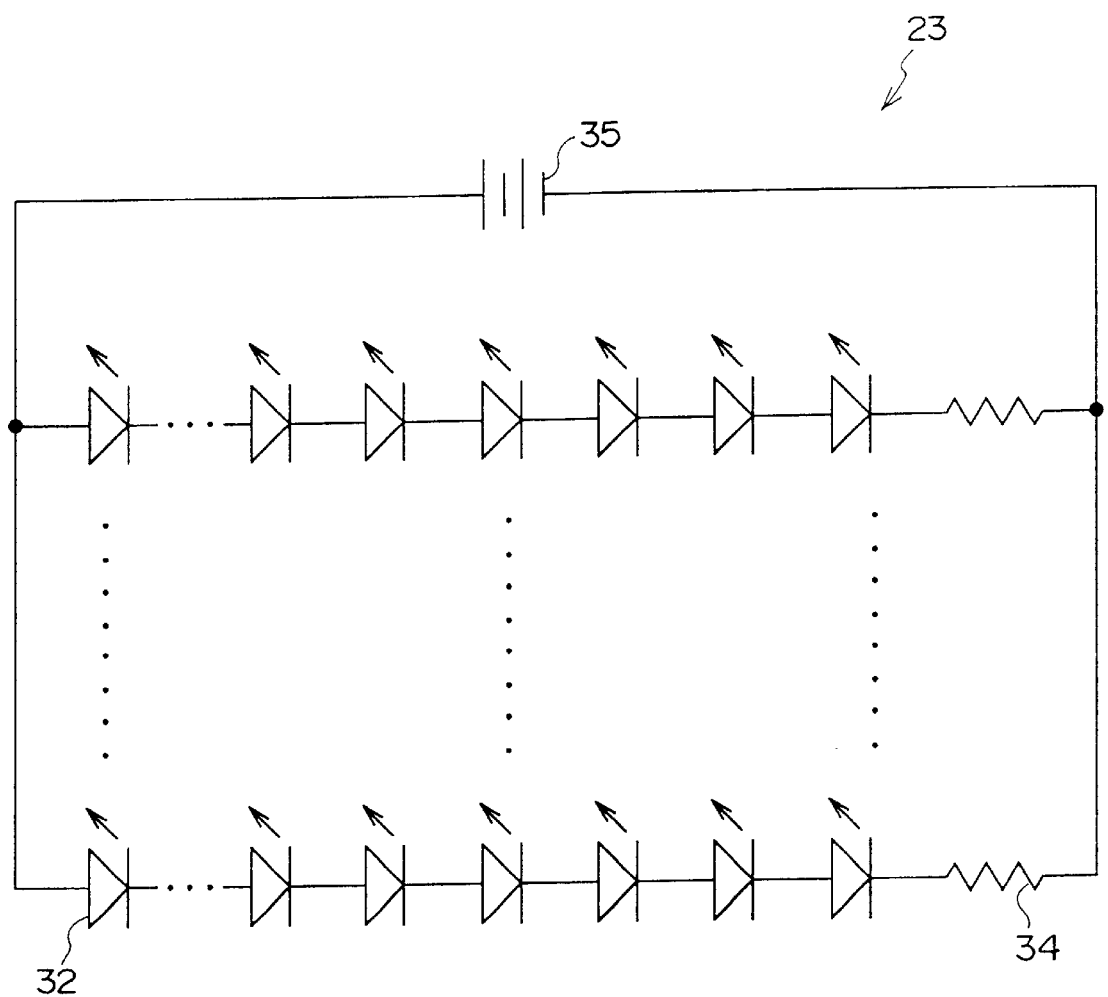
FIG. 3 illustrates a circuit diagram for the energy or light source of FIG. 2.

Referring to FIG. 3, the energy source 23 includes a series of light emitting diodes ("LED") 32 extending in a linear arrangement. As the sensing field 24 substantially consists of light in the IR region, the LEDs 32 are IR LEDs.

The LEDs 32 extend along the steering wheel support 31, behind the steering wheel 12. Preferably, there are series of rows of the LEDs 32, extending adjacent to one another along the width of the steering wheel support 31, forming an array.

Figure 4:
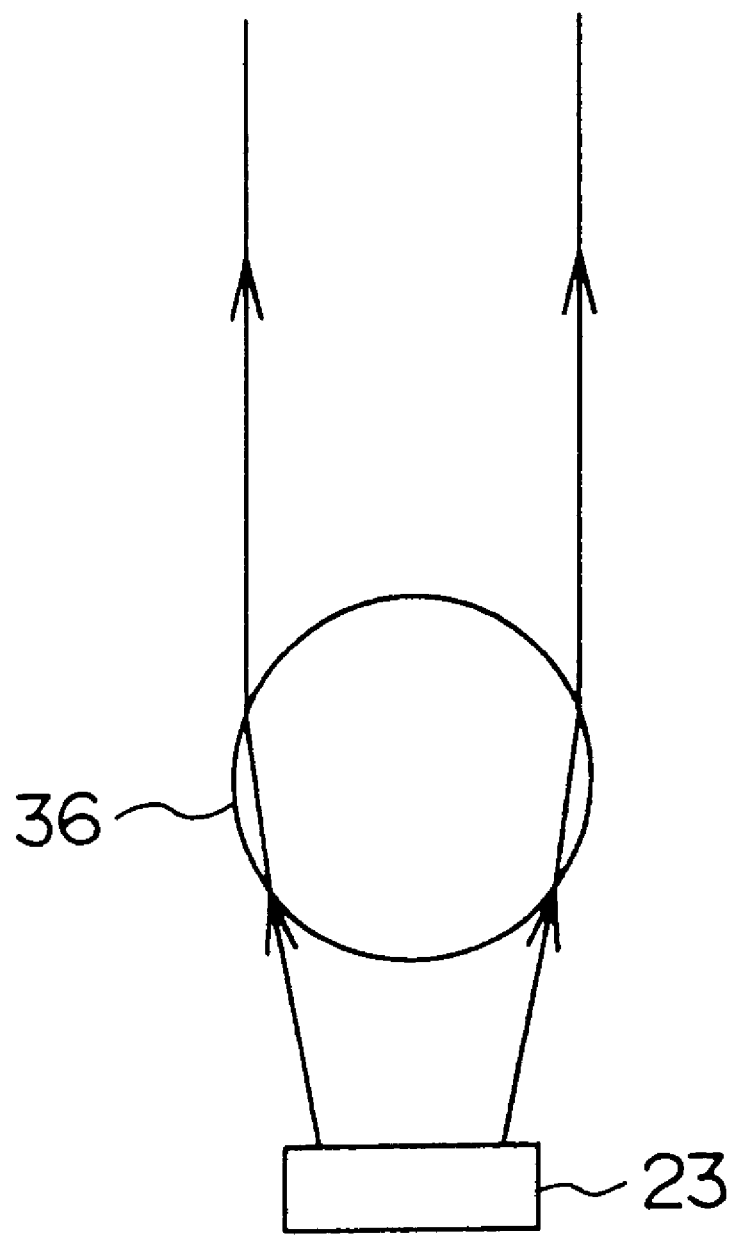
FIG. 4 schematically illustrates an end view of the light source of FIG. 2.

Referring to FIG. 4, a substantially clear rod or cylindrical lens 36 preferably extends along the width of the steering wheel support 31, above the LED array of the energy source 32. The cylindrical lens 36 narrows the IR light emitting angle from the LEDs 32. Narrowing the emitting angle functions to collimate the light more precisely into a sensing field 24 of a screen of IR light extending along the virtual control panel area. Preferably the array of LEDs 32 is embedded in the steering wheel support 31, with the cylindrical lens 36 embedded above the array. In an alternative preferred embodiment, a semi-cylindrical lens is used, with the light radiating outward from the curved outer surface of the semi-cylindrical lens.

The number of LEDs 32 depends on factors such as the size of the particular vehicle, the specifications of the LEDs, and the limitations of the image sensor 22. The size of the cylindrical lens 36 also depends upon such factors.

However, in one prototype with a 1988 Toyota Camry, eight rows, each of ten LEDs 32, was determined to be satisfactory for most applications. The LEDs 32 in each row were electrically connected in series with one another along with a resistor 34 of approximately 100 ohms. Each row was connected in parallel to a DC voltage source 35 of approximately 17 volts. A substantially clear plastic rod having a diameter of approximately ½ inch (12.7 mm), was employed for the cylindrical lens 36, and spaced approximately 3 mm above the array of LEDs 32. Both the LEDs 32 and the cylindrical lens 36 were embedded in the steering wheel support 31, behind the steering wheel 12.

According to specifications available for the LEDs 32, each LED had a power consumption of 100 mW, emitted IR radiation at a nominal wavelength of 940 nm, and drew 100 mA of current at a voltage drop of 1.5 V across the LED, and had a diameter of 3 mm.

For the sensor 22, an 8-bit gray CCD board camera was mounted on the vehicle instrument panel 26 in the prototype. A CCD board camera was chosen for the image sensor 22, because of its compact size, low cost, and relatively high resolution. The CCD camera is preferably embedded in the instrument panel 26, with its centerline substantially perpendicular to the steering wheel plane and centered with the upper half of the steering wheel 12. These settings help to ensure that the distortion area of the illuminated object remains minimized, so as to keep the illuminated area as constant as possible when an object is moved within the IR radiation sensing field 24.

The camera was a commercially available type, model no. V1205, produced by Marshall Electronics Inc. of Culver City, Calif. Specifications available for the camera were as follows:

Picture Size: 537 (horizontal)×505 (vertical) approximately 270,000 pixels

Signal to noise ratio: >48 dB

Min. Illumination: 0.005 FC (0.05 Lux)

Resolution: 380 TV lines min.

Iris Control: Electronic

Lens Mount: Adjustable with set screw

Connectors: 3 wire plug-in connector, Video, Power, Ground

Lens: 3.6 mm f2.0 (74°H×56°V)

Auto Iris Range: 0.5–80 Lux @ f1.4

Power: 12 VDC, 100 mA, 1.2 W

Size: 1.73 in. w (4.39 cm)×1.73 in. h (4.39 cm)×1.22 in. d (3.10 cm)

Weight: 1.2 ounces (35 grams)

Ultra-low light 0.005 FC sensitivity

IR sensitive to 1100 nm

The angle of view of a camera changes with image size and the focal length of the camera lens. In the prototype, the camera was embedded in the instrument panel 26 between the tachometer and the speedometer. The distance, D, from the camera lens to the steering wheel plane was approximately 12 inches (30.48 cm).

A focal length suitable for viewing the virtual control panel area was calculated from formulas (1) and (2) as follows:

$$f = v \times D / V \qquad (1)$$

and ti $f = h \times D / H + tm$ (2)

Wherein the symbols in formulas (1) and (2) are defined as follows:

f=Focal length of lens

V=Vertical size of object

H=Horizontal size of object

D=Distance from lens to object v=vertical size of image (see the following table)

h=Horizontal size of image (see the follow following table)

| Format | 1 in. (25.4 mm) | ⅔ in. (16.9 mm) | ½ in. (12.7 mm) | ⅓ in. (8.47 mm) |
|---|---|---|---|---|
| v | 9.6 mm | 6.6 mm | 4.8 mm | 3.6 mm |
| h | 12.8 mm | 8.8 mm | 6.4 mm | 4.8 mm |

Because the maximum horizontal dimension of the virtual control panel is greater than its maximum vertical dimension, Formula (2) is used to calculate the focal length. In the prototype, the virtual control panel area had a maximum horizontal dimension of approximately 15 inches (38.10 cm). Therefore:

$$f = h \times D/H = 4.8 \text{ mm} \times (12/15) = 3.84 \text{ mm}$$

A lens with a 3.6 mm focal length was chosen because it was the closest available lens to 3.84 mm. In the prototype, two band pass filters 29 were used behind the lens. According to available specifications for the filters, the first filter had a bandwidth of 950 nm±25 nm, and the second filter had a bandwidth of 940 nm±5 nm.

Figure 5:
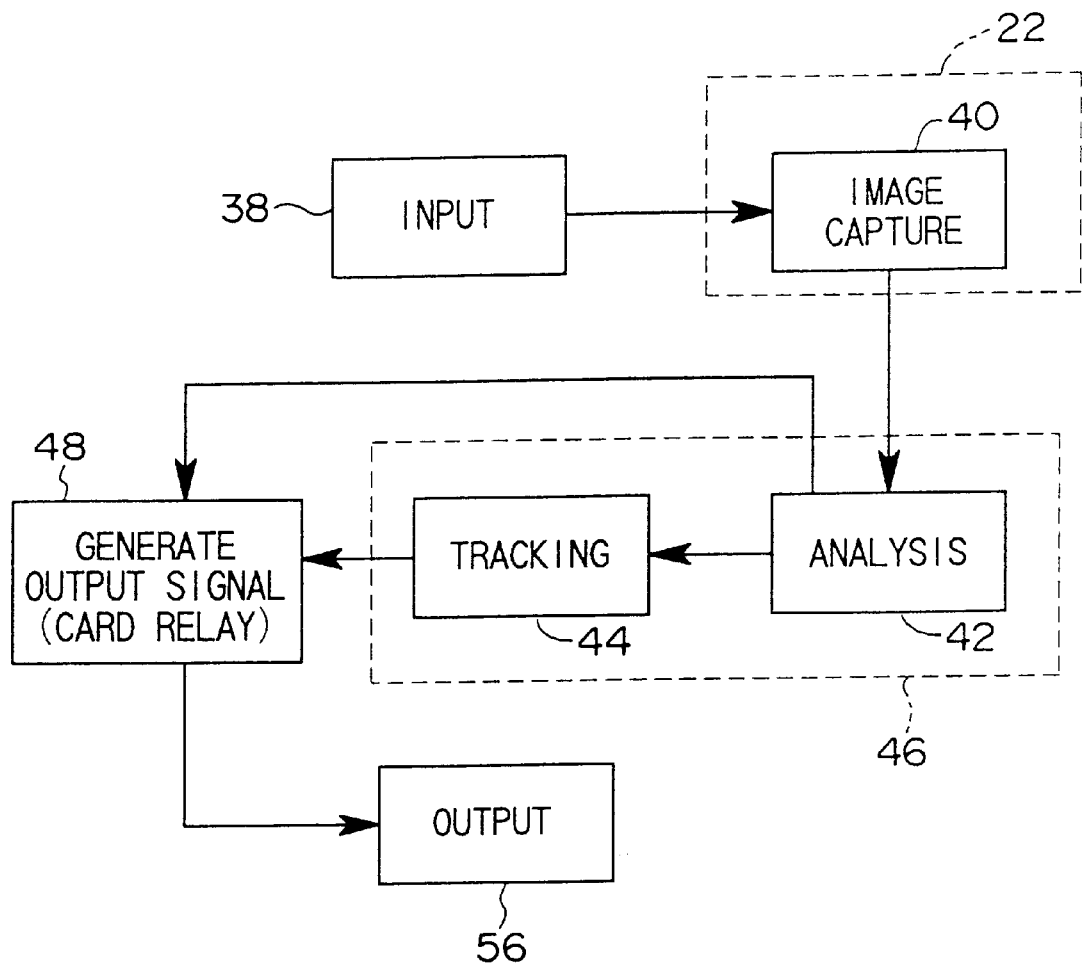
FIG. 5 illustrates a schematic block diagram of the interface system.

FIG. 5 illustrates a schematic block diagram of the computer interface system. Block 38 indicates the user's input, which is some form of action in the virtual control panel area. Block 40 indicates image capture. Specifically, the sensor 22 produces data indicating user action in the virtual control panel area. Blocks 42 and 44 together indicate analysis by the computer 46.

In the system, the sensor 22 monitors the control panel and stores data as an on-going series of images in computer format in memory. Software in the computer 46 performs a loop, analyzing the images as they become available to determine if there has been an action within the virtual control panel area.

In the prototype, the sensor 22 was satisfactorily interfaced to the computer through a commercially available video frame grabber board, model no. M-Vision 500, made by MuTech Corporation of Billerica, Mass. The frame grabber suitably formats information from the sensor 22 for the computer as image data for analysis. In particular, the image data is stored in memory in computer image format as a series of images.

Software for the prototype was developed using a commercially available software package, sold under the trademark VISIONBLOX, developed by Vision 1, of Bozeman, Mont. The software package includes many built-in standard vision tools, such as feature finding, calibration and "blob" analysis. In addition, the software package supports ActiveX control, software developed by Microsoft Corporation of Redmond, Wash. Application development can therefore be done under Microsoft Visual Basic. Microsoft Visual Basic is additional software available from Microsoft Corporation, and which has a good graphical user interface ("GUI"). Also, the software package supports the use of a digital I/O card so that an application can be easily interfaced with actual motor vehicle devices.

The software that was developed, searches each image for an indication of user action in the virtual control panel area. The user's fingertip or thumb, more-or-less appear as a "blob" in images from the sensor 22 of the virtual control panel area. The software logic attempts to find a blob based on a particular range of blob areas and threshold settings. The blob area setting was based on the area that appears in the camera images when the user inserts a fingertip into the virtual control panel area. The threshold setting was set to focus on the brightest part of the image.

In the most demanding test scenario, the threshold value was set to 254 and 255, on a grayscale range of 0 to 255. In this scenario, the prototype was subjected to direct sunlight through the vehicle windshield 26 on a very sunny day. Under these conditions, the threshold had to be adjusted to 254 to 255 for the software to be able to distinguish a blob from outside noise. As such, only the bright white portion of the image was included for analysis.

However, a lower threshold is possible when sunlight does not shine directly through the front windshield. Under these conditions, it was found that the threshold could be reduced to as low as 200.

Nonetheless, it was found that the depth of the button triggering position relative to the image sensor 22, varied with different sunlight intensities, as contrasts varied. To achieve a more constant depth of button triggering in alternative preferred embodiments, stronger IR light for the energy source 30 is preferred, either more IR LEDs 32 or IR LEDs that are brighter, or a combination thereof. Another alternative is synchronous strobing to provide high light intensity just for the instant when the camera is capturing the image.

Additionally, IR filtering glass for the vehicle windows is preferred, or an IR filtering film disposed on the vehicle windows. The most demanding scenario for the computer interface system will be with convertible or no-top vehicles.

The blob area was determined experimentally to fall within a range of 2000 to 10000 pixels. More particularly, it was observed that the detected blob almost always occupies a generally rectangular area, ranging in size from 30×60 pixels (approximately 2000 pixels) to 100×100 pixels (10000 pixels).

If the software determines there is a blob present in an image, it is interpreted as a user action or input. In this case, the software determines the coordinates of the approximate center of the blob by averaging the X and Y coordinate values of all of the points inside the blob. Based on the location of the blob center, the logic designates this as a particular user action or input.

Many different modes are suitable for user action/input through the virtual control panel, such as keys, buttons, alphanumeric character entry zones, and/or other control elements. In one prototype, there were two different basic function modes, "button mode" and "tracking mode".

In button mode the virtual control panel was divided into up to six sections, with each section defined as a button. With six sections, the virtual control panel area was divided into two columns of three rows each. An advantage of this method of button placement is that all buttons can be accessed with the user's thumbs. This way, the system can be operated with both hands remaining on the steering wheel 12.

When the user performs an action in the virtual control panel area, the system determines in which section the action occurred, and the button, i.e., function associated with that section. If the action is maintenance of contact with that section or button for at least a predetermined period of time (one second for the prototype), the system executes the function associated with that section/button.

The software determines the section with which contact occurred according to the location of the nominal center of the blob. Based on a series of images, if the software determines the blob center has been located in that section for a preset period of time, the logic designates this as a user action/input for activating a function associated with the button corresponding to that section. If the blob center is not present for the preset period of time, the software logic resets for a new user action/input.

In tracking mode the software stores blob center locations in an array from a series of images. Once blobs are no longer detected, (i.e., there is a null element in the array), the software uses a subroutine to compute the motion and perform functions based on the computation result.

In the software for the prototype, a motion tracking module compares images for the location of blob centers relative to one another. The software then determines whether there has been motion from down to up, up to down, left to right, or right to left in the virtual control panel area. The software thereafter designates this as a user input for seeking radio channels, CD tracks, or a volume adjustment, as appropriate.

While software developed using Microsoft Visual Basic was satisfactory for prototype demonstration purposes, preferably the interface system will employ software developed using the C or C++ programming language. In this regard, Microsoft Visual Basic is a comparatively low efficiency and slow programming language/compiler. In developing the motion tracking module, limitations were encountered in the way the software could be written to analyze user input. Specifically, software processing had to be limited to avoid unacceptable delays in analyzing user input entered through the interface in tracking mode. As computer processing speeds continue to increase, perhaps this will drawback will be eliminated.

Additionally, the software will preferably be extended to include handwriting recognition. That is, handwriting strokes with a user's finger in the virtual control panel area, will be interpreted as alphanumeric input. Alphanumeric input would be particularly convenient for interacting with a vehicle GPS navigation system, for activities such as entering destination information.

Consideration was given to using software for handwriting recognition, developed by Communication Intelligence Corporation ("CIC") of Redwood Shores, Calif.

Unfortunately, there were software compatibility issues in the prototype, as the handwriting recognition software was developed using a C-based programming language. Since software developed using a C-based programming language is more common and typically more efficient and less platform dependent than that using Microsoft Visual Basic, preferably the software in the interface is developed using a C-based programming language.

If the software logic determines there has been user action/input for activating a vehicle function, the software causes the computer 46 to generate an appropriate output signal, indicated by box 48 in FIG. 5. If the user action occurred during button mode, the system logic proceeds from the analysis block 42 to output block 48 (if such output is appropriate for the user action), as there is no need for tracking analysis in button mode. In tracking mode, the logic proceeds to block 44 for tracking computations, after the analysis block 42, before generating appropriate output.

Figure 6:
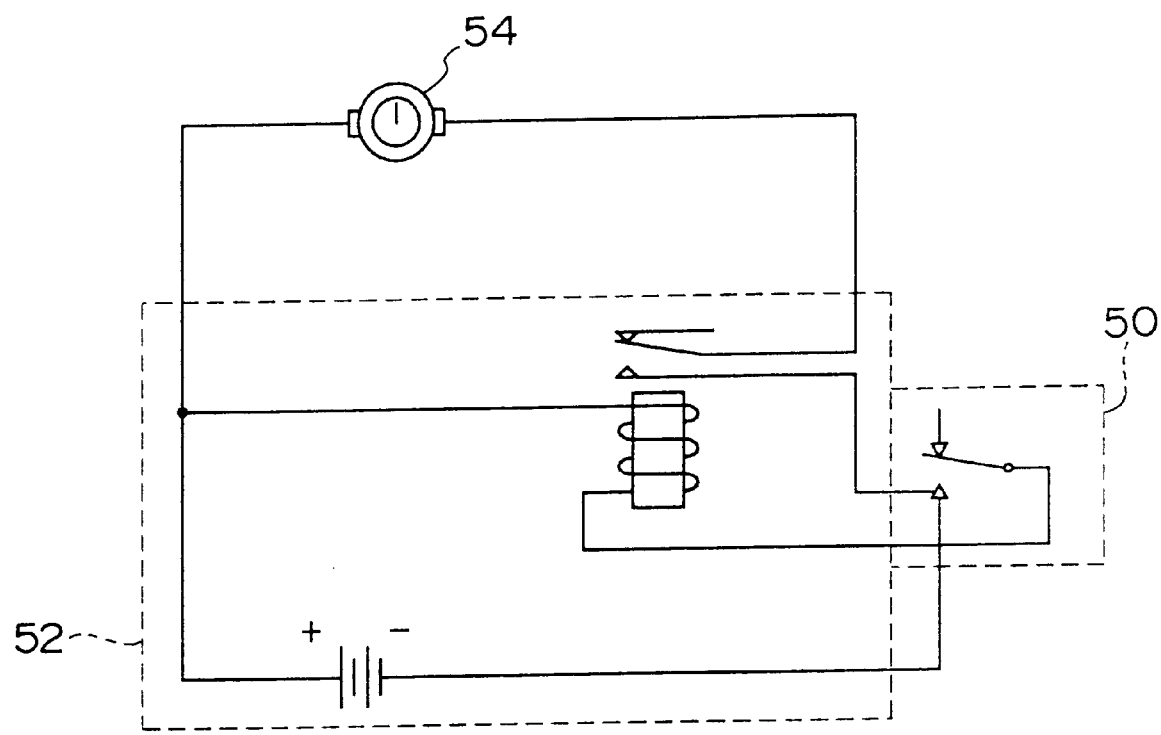
FIG. 6 schematically illustrates a relay circuit for the computer interface system of FIG. 1.

For activating motor vehicle functions, such as the wipers, radio, CD player, and etc., a digital I/O 50 card is used, schematically illustrated in FIG. 6. In the prototype, the digital I/O card 50 was a commercially available type, model no. PCL-725, from Advantech Co., Ltd. of Irvine, Calif. This device offers sixteen digital I/O ports (eight input and output), with eight relay actuators and eight optically isolated digital inputs on a single board. Although there is no custom ActiveX control for the card, there is a dynamic load library file ("DLL") named IOS32.DLL that can be used to gain access to digital input and output under a standard programming environment.

The digital I/O card 50 relay outputs in the prototype were rated for only one ampere maximum of current. Therefore, a standard solid state relay 52, having specifications of a maximum of fifteen amperes at one hundred volts DC, was connected to the digital I/O card 50 for vehicle functions requiring greater current, such as the wiper motor 54. Box 56 in FIG. 5 represents output via the solid state relay 52, while box 48 represents output via the digital I/O card 50.

In the prototype, a computer display was positioned in front of the driver seat to simulate a HUD (heads-up display). Computer output/feedback includes changing the display 20 as appropriate in response to user input. For example, in one prototype, control of the windshield wipers and the car stereo was implemented.

The windshield wiper had simple on/off control. The stereo included the typical functions of power on, power off, volume up, volume down, switching between radio and CD, and right/left seek. When the user inputs "radio on" by pressing the associated button on the virtual control panel, the display 20 changes to display a menu for stereo functions only, i.e., the stereo menu. FIG. 1 shows the display 20 with the stereo menu.

Computer feedback via the display 20 requires visual concentration from the user. To relieve the load on the driver's vision, however, the interface system preferably includes feedback other than visual. Devices such as the windshield wipers and the stereo offer feedback simply by their activation, which relieves the concentration load on the driver's vision to some degree. The computer 46 preferably provides audio feedback also, either through the speakers for the vehicles sound system, or speakers dedicated for computer audio output.

The interface system further preferably includes haptic feedback, i.e., feedback relating to, or based on the sense of touch, for additionally relieving the load on the driver's vision. Haptic vibration feedback is preferably implemented in areas continuously in contact with the vehicle operator while driving, such as the steering wheel 12 and the seat 58 on the driver's side.

The vibration devices should be strong enough to be felt while driving, and generate a vibration frequency greater than typical car vibrations. In the prototype, motors from conventional pagers and massagers were found suitable.

Pager motors are compact, cost effective, and have localized vibration at a frequency greater than typical road vibration (9000 RPM for the motors). Massage motors have a greater amplitude of vibration than the pager motors, making the vibration less localized. However, this allows for two distinguishable types of vibration feedback.

Referring to FIG. 1, a pager motor 60 is preferably imbedded on each of the right and left sides of the steering wheel rim 16. The interface system vibrates the pager motors 60 to indicate to the user that contact is being made with the virtual control panel active area. In the interface system, preferably both pager motors 60 vibrate at the same time for indicating to the user that contact is being made with an active area on the virtual control panel.

Nonetheless, experiments with the prototype indicated that the user is capable of distinguishing between operation of the right and left pager motors 60. This allows for an alternative set of haptic feedback modes. Notwithstanding, there may be times when the user is driving only with one hand. This is especially possible if the user chooses to enter inputs using his or her index finger. In this case, haptic feedback may be lost depending on the position of the user's hand. Thus, both steering wheel pager motors 60 preferably vibrate at the same time.

An additional pager motor 60 is preferably inserted into each side of the driver's seat. Further, a larger massage motor 62 is inserted into the seat 58 midway between the left and right seat sides. The motors 60 and 62 in the seat 58 are preferably capped with a plastic shell to isolate the rotor from padding in the seat 58. The motor positions in the seat 58 are chosen such that the user should be in close proximity thereto at all times while driving. Therefore, the pager motors 60 in the seat can be selectively activated to differentiate between right and left.

Preferably, when the user is moving a finger for computer input from right to left in the tracking mode, other directional output functions such as rewind, left tune seek, skip to the previous song, and etc. are used, the interface system activates the left pager motor 60. Similarly, the interface system activates the right pager motor 60 to signify directional movements to the right. The stronger vibration massager motor 62 in the seat center is preferably reserved for yet another mode of feedback, such as an error indicator.

In the prototype, the pager and massager motors 60 and 62 were approximately cylindrical. The pager motors 60 had specifications of 9000 rpm, operating at 1.3 VDC and 85 mA, a motor size of 0.55 in. (14.0 mm) length, 0.17 in. (4.31 mm) diameter, and a shaft size of 0.21 in. (5.33 mm) and 0.15 in. (3.81 mm) diameter. The massager motor 62 had specifications of 9000 rpm at 3 VDC and 200 mA, a motor size of 1.20 in. (30.48 mm) length, and 1.00 in. (25.40 mm) diameter, and a shaft size of 0.42 in. (10.67 mm) length, and 0.08 in. (2.03 mm) diameter. Standard C-type batteries were used to power the pager and massager motors 60 and 62.

The computer 46 is preferably a conventional type, having its components installed in the vehicle center console, or behind the dashboard or instrument panel 26. In alternative embodiments, the computer 46 is integrated with another system, such a vehicle navigation system or stereo. In this regard, there have been proposals to integrate computers with vehicle stereo systems, to provide for Internet access via the vehicle stereo system. Alternatively, the computer 46 may be part of a more generalized multimedia system, integrated with the vehicle stereo system.

In another alternative preferred embodiment, an acoustic location system may be used to determine the location of user contacts with the virtual control panel area. An acoustic system has the advantage of being free from interference from IR radiation in sunlight. If the acoustic waves are in an inaudible range, transparency to the user is maintained. However, the acoustic waves should be at a frequency that does not include typical vibrations present in a vehicle, for achieving a suitable signal-to-noise ratio.

A reference marker is preferably placed on back of the steering wheel 12, such as on the steering wheel rim 18. The reference marker is for when the driver turns the wheel, such as on a curve in the road, and interacts with the interface system. The software examines the images for the location of the reference marker, and applies a transformation of coordinates to match the wheel turn angle. The software thus accounts for turn angle of the steering wheel 12 in designating a user contact with the control panel as a particular input.

The computer interface system further preferably includes rotary motion detection implemented in software logic. The logic detects rotary motion of a user's fingertip or thumb on the virtual control panel and the rotation direction (clockwise or counter-clockwise). The interface thus includes a "virtual jog-shuttle device" for greater user convenience in entering some forms of input, such as for scrolling the computer display 20.

Additionally, the software preferably includes gesture recognition. Since there are alternative preferred embodiments as previously described, it will be appreciated that alterations, substitutions and modifications can be made by one of ordinary skill in the art. Therefore, it is intended that the scope of letters patent granted hereon be limited only by the definitions of the appended claims.

What is claimed is:

1. A system for computer user interface, comprising:
   (a) an energy source disposed for producing a sensing field within a closed area in a first plane when the energy source is operated;
   (b) a sensor disposed in a second plane that is different from the first plane for monitoring the closed area and producing electronic information corresponding to user action within the closed area in the first plane that causes at least a portion of the sensing field within the closed area to be redirected towards the sensor when the sensor is operated; and
   (c) a computer electronically connected to the sensor, the computer receiving electronic information produced by the sensor when the computer is operated, the computer including logic which analyzes electronic information received from the sensor and produces output signals corresponding to user action within the closed area, wherein the energy source is located on a steering wheel of a vehicle and the sensor is located on an instrumental panel of the vehicle.

2. The system of claim 1, further comprising a vibrator electronically connected to the computer, and operable by a computer output signal for providing feedback to the user.

3. The system of claim 1, wherein the energy source comprises a light source oriented for irradiating a screen of infrared light upwardly when the light source is operated, with the screen of infrared light comprising the sensing field.

4. The system of claim 1, further comprising a display electronically connected to the computer, wherein the computer includes logic, which when executed by the computer, causes a map to be shown on the display, indicating locations of predefined sections within the closed area, and information corresponding to a function that will be performed if there is user action in that predefined section of the closed area.

5. The system of claim 1, wherein the energy source comprises a series of light emitting diodes extending in a linear arrangement relative to one another.

6. The system of claim 1, wherein the system is for use in a motor vehicle having a steering wheel with a steering wheel upper half having an open region, said closed area substantially corresponding to region in the steering wheel upper half.

7. The system of claim 1, wherein the sensor comprises a digital camera type sensor.

8. A system for computer user interface, comprising:
   (a) an energy source disposed for irradiating energy within a closed area in a first plane, the energy including light in the infrared region when the energy source is operated;
   (b) a sensor disposed in a second plane that is different from the first plane, the sensor for monitoring the closed area and producing electronic information corresponding to user action within the closed area in the first plane that causes at least a portion of the light within the closed area to be redirected towards the sensor when the sensor is operated; and
   (c) a computer electronically connected to the sensor, the computer receiving electronic information produced by the sensor when the computer is operated, the computer including logic which analyzes electronic information received from the sensor and produces output as appropriate in response to user action within the closed area, wherein the energy source is located on a steering wheel of a vehicle and the sensor is located on an instrumental panel of the vehicle.

9. The system of claim 8, further comprising a vibrator electronically connected to the computer, and operated by the computer in response to at least some user action for feedback to the user.

10. The system of claim 8, wherein the energy source comprises a plurality of light emitting diodes positioned for irradiating the light upwardly.

11. The system of claim 8, wherein the system is for use in a motor vehicle having a steering wheel with a region in a steering wheel upper half, said closed area substantially corresponding to the region in the steering wheel upper half.

12. The system of claim 8, wherein the sensor comprises a digital camera type sensor.

13. The system of claim 8, wherein the energy source includes a lens for collimating the light, the lens having opposing surfaces, with at least one surface being substantially semi-cylindrical.

14. A method of providing a computer user interface in a vehicle having a steering wheel, the method comprising the steps of:
(a) defining a closed area in a first plane that is proximate the steering wheel as a virtual control panel for a user to enter inputs by user action within the closed area;
(b) using an energy source to produce a sensing field extending substantially along the closed area for aiding the sensor in detecting user action within the closed area;
(c) monitoring the closed area with a sensor in a second plane that is different from the first plane, which produces electronic information corresponding to user action within the closed area in the first plane that causes at least a portion of a sensing field within the closed area to be redirected towards the sensor; and
(d) computer processing the electronic information using logic which analyzes the electronic information and produces output as appropriate to user action within the closed area, wherein the energy source is located on the steering wheel of the vehicle and the sensor is located on an instrumental panel of the vehicle.

15. The method of claim 14, wherein the step of monitoring the predefined area with a sensor, includes using a digital camera type sensor.

16. The method of claim 14, further comprising the steps of:
(a) mounting a vibrator in the vehicle at a location proximate the user when the user is positioned for driving the vehicle; and
(b) selectively operating the vibrator via the computer for providing haptic feedback to the user.

17. The method of claim 14, wherein the step of using an energy source includes operating a series of light emitting diodes oriented for radiating electromagnetic radiation across the area for forming the sensing field.

18. The method of claim 14, wherein the step of using an energy source, includes using an energy source which produces a sensing field substantially consisting of electromagnetic radiation in a bandwidth invisible to human eyesight.

19. The method of claim 18, wherein the step of using an energy source, includes orienting the energy source to produce the sensing field with the electromagnetic radiation thereof, radiating upwardly relative to the vehicle.

* * * * *